United States Patent [19]

Tigert

[11] Patent Number: 4,612,876
[45] Date of Patent: Sep. 23, 1986

[54] AQUARIUM

[75] Inventor: Donald J. Tigert, Fort Worth, Tex.

[73] Assignee: Unique Gifts, Inc., Ft. Worth, Tex.

[21] Appl. No.: 794,639

[22] Filed: Nov. 4, 1985

Related U.S. Application Data

[63] Continuation-in-part of Ser. No. 686,656, Dec. 27, 1984, abandoned.

[51] Int. Cl.⁴ ............................................. A01K 64/00
[52] U.S. Cl. ........................................................ 119/5
[58] Field of Search ............................................ 119/5

[56] References Cited

U.S. PATENT DOCUMENTS

| | | | |
|---|---|---|---|
| 1,333,454 | 3/1920 | Sato | 119/5 |
| 4,082,062 | 4/1978 | Rodemeyer | 119/5 |
| 4,196,695 | 4/1980 | Zupo | 119/5 |
| 4,236,488 | 12/1980 | Olds et al. | 119/5 |

Primary Examiner—Hugh R. Chamblee
Attorney, Agent, or Firm—Wofford Fails & Zobal

[57] ABSTRACT

An aquarium for maintaining fish or the like characterized by an upper transparent container means that has its side wall, bottom and a valve body integrally formed together to prevent leaks. The transparent container sits on a base. An air pump, air conduit, and air flow control valve are disposed out of sight interiorly of the base. The valve body contains the check valve and serves as an air inlet for bubbling air upwardly through the water at a controlled rate provided by the air flow control valve. The check valve prevents leaking back into the air inlet passageway in the event the power is interrupted and prevents leaking a substantial quantity in the event that the hose, or air conduit, is inadvertently disconnected. Also disclosed is a kit embodiment which is sold on the retail market in which all the elements are provided.

3 Claims, 3 Drawing Figures

_4,612,876_

AQUARIUM

CROSS REFERENCES TO RELATED APPLICATIONS

This application is a continuation-in-part of U.S. Ser. No. 06/686,656, filed Dec. 27, 1984, same inventor and same title now abandoned.

FIELD OF THE INVENTION

This invention relates to aquariums; and, more particularly, to aquariums for maintaining fish or the like.

DESCRIPTION OF THE PRIOR ART

The prior art has seen the development of a wide variety of aquariums, running from the large commerical aquariums such as can be seen in the respective municipal aquariums in which oxygen is pumped downwardly through tubes to bubble out into and oxygenate the water for maintaining aquatic life; to the home type aquariums only a few cubic feet in size. Usually with these latter types of aquariums, an air pump is provided exteriorly of the aquarium and it pumps air through a conduit over the top and downwardly into the tank of the aquarium.

Typical of the prior art are the following U.S. Pat. Nos.:

1,333,454 describes an illuminated aquarium in which a light is disposed in a base and in which the aquarium has water, aquatic vegetation anchored to the bottom of the vessel and an ornate top. That patent is silent as to whether or not air is bubbled through the water for aeration and no means for doing so is illustrated or described.

4,082,062 shows an integrated aquarium having separate sides that engage the base and a rim at the top for receiving a lid and which have separate air inlet tubes for aeration and have a separate check valve installed in the air line. The patent does not provide insurance against leaks, however, as by having the sides and bottom integrally formed together and having the valve body integrally formed into the bottom. Consequently, it is possible to have disastrous leaks that at the least cause damage and at the most would cause unsafe electrical shock so as to endanger children playing around the aquarium.

4,196,695 describes an aquarium life support system in which transparent walls are joined with a bottom having a central drain opening and additional openings through which air supply tubes and a heating device are extended. The patent has the same disadvantages discussed hereinbefore with respect to U.S. Pat. No. 4,082,062 in that it does not provide integrally formed together walls and bottoms and integrally formed valve body (through which air can be passed upwardly through the unit) so as to prevent leaks. Rather, the patent can leak and can at least mess up the carpet on which it sets, or, apparently, provide electrical shorts and the like.

4,236,488 shows a separable multi-component aquarium filtering and cleaning device for tall aquariums whose depth makes the aquatic life inaccessible. This device allows filtering the water and cleaning the inside walls of the aquarium, providing heat and light. The primary benefit for this invention is to allow accessibility to remove dead fish or the like and employs a freestanding filtration system in the form of a sponge sandwiched between two rigid plastic sheets. This patent, similarly as with respect to the two foregoing patents, does not have integrally formed together sides and bottom with integral air inlet valve body serving to have the check valve also. Accordingly, the apparatus of this patent, also could develop leaks with the deleterious effects delineated hereinbefore.

It is desirable that an aquarium have the following features not found heretofore.

(1) It is desirable that the aquarium have an air inlet for passage of an oxygen-containing gas upwardly from the bottom of the transparent container toward the top of the aquarium through the water to oxygenate the water; yet not have the problem with leaks developing, as from vibration of the air pump or shipping.

(2) It is desirable to provide an air pump and associated air conduit and valves below the upper transparent container of the aquarium and, particularly, within the confines of the base; in order to provide improved appearance without the clutter normally associated with the aquarium; and to provide a means for controlling the flow of air from the air pump upwardly through the water.

(3) It is desirable to provide a check valve means in the air inlet passageway in the bottom in order to prevent the water from causing damage and unsafe environment by allowing leaks or flow into the electrical connections in the base.

(4) It is particularly desirable to provide a structure in which the side walls and the bottom are integrally formed together and in which a valve body is incorporated and integrally formed into the bottom so as to obviate problems with leaks developing as in the prior art.

From the foregoing, it can be see that the prior art has not provided an economical home aquarium for use by children and the like that has these desirable features.

SUMMARY OF THE INVENTION

Accordingly, it is an object of this invention to provide an economical aquarium for the home and the like that has one or more of the features delineated hereinbefore as being desirable and not heretofore provided by the prior art.

It is a specific object of this invention to provide an economical home type aquarium having all the features delineated hereinbefore as desirable and not heretofore provided.

These and other object will become apparent from the descriptive matter hereinafter, particularly when taken in conjunction with the appended drawings.

In accordance with this invention there is provided an aquarium for maintaining fish or the like comprising:

(a) an upper transparent container means for holding water and fish; the transparent container having integrally molded bottom and side walls so as to be waterproof and having a first size of a first predetermined dimension laterally not to exceed one foot;

(b) a base supporting the transparent container means and having a second size of a second predetermined dimension laterally sufficient to support the transparent container means and having an aperture through which a valve body nipple and protector sleeve can extend;

(c) an air pump disposed in the base for pumping an oxygen-containing gas through the transparent container.

(d) at least one air conduit connected with the bottom of the transparent container and the air pump to define a conductive air passageway from the air pump to the bottom of the transparent container.

(e) an air flow control valve disposed in the air passageway such that the rate of flow of the oxygen-containing gas can be adjusted to a desired rate and prevent killing the fish;

the transparent container having integrally molded bottom and side wall and having integrally formed with the bottom a valve body for alleviating problems with leaking; the valve body having said protector sleeve and said nipple protruding beneath said bottom; said valve body serving as body for:

i. an air inlet penetrating through the transparent container means at its bottom such that an oxygen-containing gas can be bubbled upwardly through the water in the transparent container means without leaking; and ii. a check valve for preventing water from running into the air passageway, thereby preventing water from running through the transparent container through the air inlet into the base, thereby preventing a safety hazard;

said valve body protruding upwardly from the bottom into which it is integrally formed, into the transparent container for distance sufficient to allow simulated gravel to be disposed into the bottom of the aquarium and about the check valve such that oxygen-containing gas can be bubbled upwardly without agitating settlings in the simulated gravel; and the air pump, air conduits and air flow control valve being disposed in the base out of sight; and g. simulated gravel disposed in the bottom of the aquarium so as to receive settlings from the water in the upper transparent container means.

In a preferred embodiment, the check valve has a flat natural rubber flapper that seats on a flat seat of substantial planarity for sealing and has a snap-in top having an upwardly extending nipple disposed above the bottom for passing of air interiorly and up through the transparent container and the water therewithin.

DESCRIPTION OF PREFERRED EMBODIMENT(S)

This invention may be useful in a plurality of technologies. It has been developed and sold in connection with a small aquarium for the home or the like for maintaining live fish, and it is in this environment that it will be described hereinafter.

Figure 1:
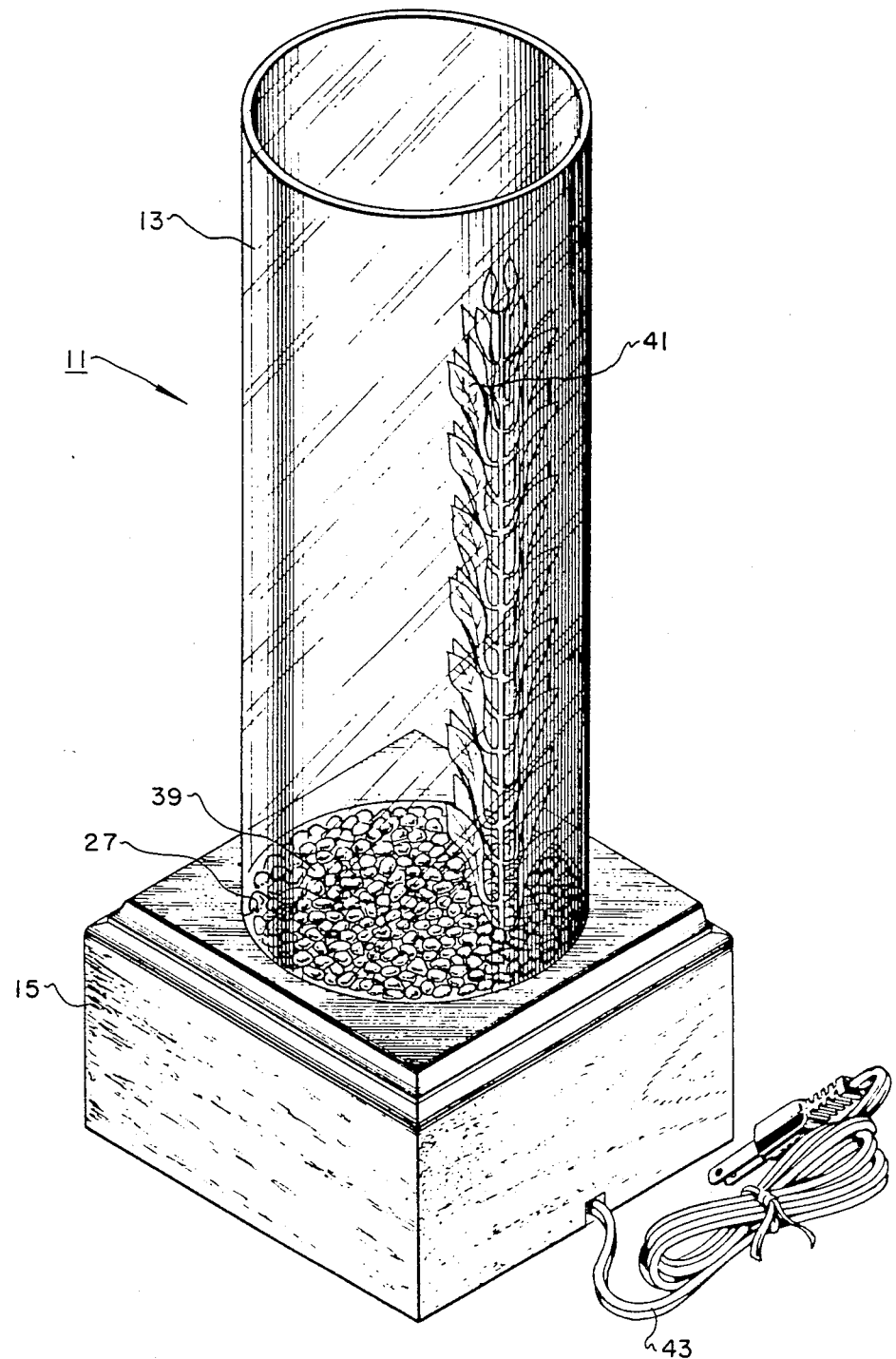
FIG. 1 is an isometric view of the aquarium in accordance with one embodiment of this invention.
Figure 2:
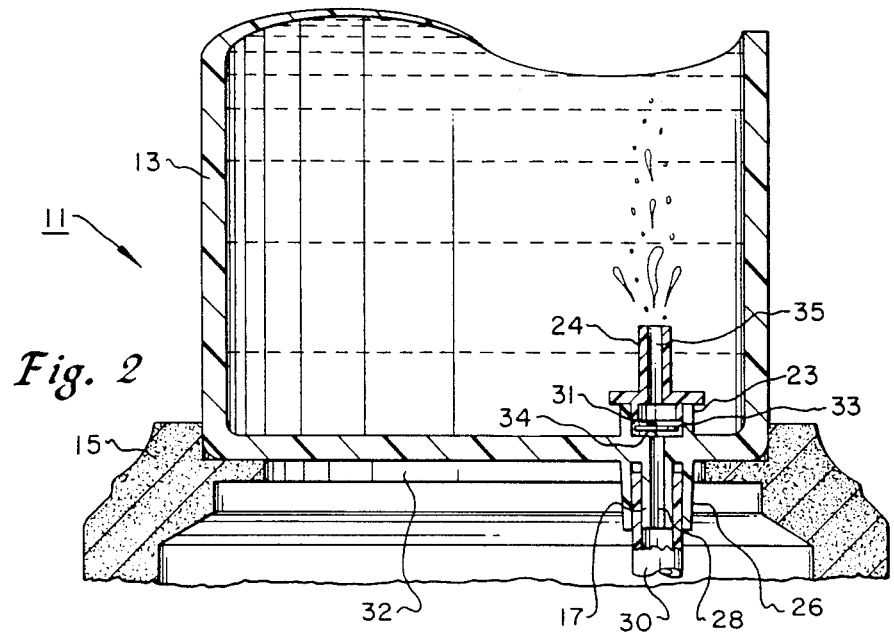
FIG. 2 is a partial side elevational view, partly schematic and partly cut away, including the integrally formed side walls, bottom, valve body and check valve in the air inlet.
Figure 3:
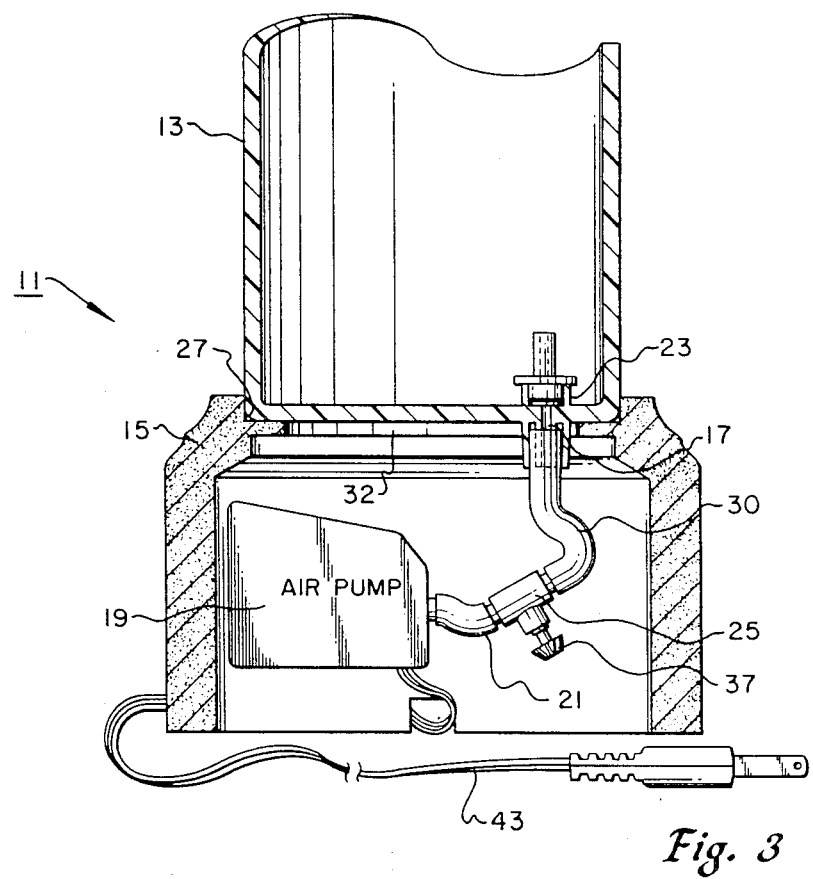
FIG. 3 is a side elevational view, partly broken away and partly in section showing the air conduit, air pump and air control valve in addition to the check valve of FIG. 2, in accordance with the embodiment of FIG. 1.

Referring to FIGS. 1-3, the aquarium 11 is designed for maintaining live fish in a home or office. The aquarium 11 includes an upward transparent container means 13 for holding water and fish; a base 15 supporting the transparent container; an air inlet 17 penetrating through the bottom of the transparent container such that oxygen-containing gas can be bubbled upwardly through the water in the container, FIGS. 2 and 3, an air pump 19 for pumping the oxygen-containing gas through the air inlet, and air conduit 21 connected with the air inlet and the air pump to define a conductive air passageway, a check valve 23 disposed in the air passageway so as to prevent water from running through the air passageway into the air pump and base, and an air flow control valve 25, FIG. 3, disposed in the air passageway such that the rate of the flow of the oxygen-containing gas can be adjusted to the desired rate.

The term air is used interchangeably herein with a oxygen-containing gas, since air is the oxygen-containing gas that will be employed in most home or office environments in which this aquarium 11 is employed. It should be borne in mind, however, that pure oxygen or other oxygen-containing gas that will oxygenate the water could be employed instead of air, per se, if desired.

The upper transparent container of the upper transparent container means 13, is made of transparent materials; preferably, plastic that can be readily molded with part of the elements or sub-assemblies molded in a common, or unitary, construction, as described hereinafter. Typical of the clear plastics are the polymethylmethacrylates.

The upper transparent container must be water impermeable and must not leak, even after vibration of shipment or after sitting with the air pump 19 running for protracted intervals. Toward this end, it has been found that better results are obtained when the bottom and side walls are molded together and have molded integrally therewith a valve body 24 and a protector sleeve 26.

The valve body 24 has integrally formed therewith a nipple 28. In order to insure that there are no leaks, the nipple 28 will have its outside dimensions interferingly fitting with the inside dimensions of the hose 30 forming a part of the air conduit 21. Moreover, the hose 30 is chosen such that its outside dimensions interferingly fits with the internal walls of the protector sleeve 26 such that there is mutual compression and frictional engagement on both sides of the hose 30 when it is installed over the nipple 28 and interferingly fitting within the protector sleeve 26. This prevents the hose from vibrating loose and allowing water to leak. Moreover, the check valve which is upstream of the hose and the nipple 28 would prevent the backflow of significant amounts of water, as will be discussed in more detail later hereinafter.

In order to insure that there are no leaks, it is imperative that the side walls and bottom as well as the valve body be integrally formed together such that no leaks develop even during the vibration caused by shipment or protracted housing of the air pump 19.

The upper transparent container can be in any desired cross-sectional shape such as square, oblong or the like. As illustrated, it is cylindrically shaped so as to have substantially circular cross-section.

The container may be of any desired size depending upon the market for which it is designed. In any event, it will have a first size of a first predetermined dimensions laterally. For example, if it is a cylinder it may be from four inches to one foot in diameter and may run from eight inches to a foot or more in height. In marketing thus far, the buyers with limited budgets have been targeted so the cylinder has been only about four and one-half inches internal diameter and about eleven inches in height. Such cylinders are readily formed with their bottoms unitarily molded therewith and the valve body molded in place to prevent leaks from developing.

The base is designed to support the transparent container 13. In fact, the base has a recess 27, FIGS. 1 and 3. It is only slightly larger that the container 13 and is adapted to conformingly receive the bottom of the upper transparent container 13. The base does have an aperture, or large hole, 32 such that the valve body protector sleeve 26, nipple 28 and hose 30 can be encompassed therewithin, for supplying air through the valve body 24.

The base may be made from any desired materials of construction appropriate to the cost and the market being targeted. For example, the base may be formed of either transparent or opaque material. Ordinarily, it is desirable to make it opaque. The base may be made of plastic such as polyurethane foam or polyacrylate; or it may be made of ceramic or wood or even concrete masonry. In the embodiments that have been employed to date it has been formed of molded plaster of paris, decorated to look like wood.

The base 15 has a second size of a second predetermined dimensions laterally sufficient to safely support the container 13. As illustrated, the second predetermined dimensions are slightly larger than the first predetermined dimensions of the upper transparent container means. For example, the base may run from six inches to fourteen inches in lateral dimensions if it is a square as illustrated. As will be apparent, it can be in any form appropriate for the container. If the container is to be in a quadrilateral configuration of cross-sectional shape like a rectangle then the base should be rectangular in shape and have dimensions appropriate to contain the upper transparent container.

The air inlet 17 will be described in more detail with respect to the check valve 23 later hereinafter. It is sufficient to note at this point that the air inlet penetrates through the bottom of the container, although it is relatively immaterial whether it is exactly at the bottom or through a side wall adjacent the bottom. In the illustrated embodiment it is easier to form the air inlet though the bottom of the container and have the requisite connections without having any of the air passageway visible exteriorly of the aquarium 11; yet, still allow the air to bubble upwardly through the water in the transparent container for oxygenating the water. It is important that the air inlet extend above the bottom such that it can bubble air upwardly without disturbing any settlings in any gravel or simulated gravel that may be put into the aquarium in the bottom and about the air inlet.

The air pump 19 may comprise any of the small air pumps conventionally employed. Several are readily available commercially and need not be described in detail herein. For example, in the illustrated embodiment the OE Oscar Magic Air 250 Air Pump, commercially available from Oscar Enterprises, Inc., Berkeley, Calif. 94710 is satisfactory. As illustrated the air pump is designed to operate directly on 110 volt alternating current to facilitate plugging directly into household current. Of course, other voltages can be employed with or without suitable transformers as desired.

It is imperative only that the air pump be able to deliver the desired amount of air to the air conduit 21 for movement up through the water in the upper transparent container to oxygenate the water.

The air conduit 21 may comprise any of the conventional types of conduit appropriate for the particular fish being employed. It is recognized that some types of metallic conduit may prove a source of microscopic contamination which is to be avoided for certain fish. Eminently satisfactory has been the polyethylene hose in small sizes. As implied hereinbefore, the polyethylene hose also has desired compressibility that allows it to frictionally engage both the nipple 28 and the interior of the protective sleeve 30 for compressed frictional fit to avoid being vibrated loose, For example, one-eighth inch hose has been found adequate. Such hose can be readily coiled around the interior of the base 15 as necessary; yet, define an air passageway between the air pump 19 and the air inlet 17. Moreover, such polyethylene hose readily fits the fittings conventionally employed on the accessories, such as the air pump 19, the flow control valve, and intermediate the nipple 28 and the protector sleeve 26.

The check valve 23 is disposed in the air passageway above the point of connection between the nipple 28 and the hose 30 so as to prevent water from running through the air passageway into the air pump and into the base, in the unlikely event that power be interrupted or the hose be inadvertently pulled from one of the fittings. The check valve 23 should avoid any valve poppets or seats that are a source of microscopic contamination or chemical contamination for certain fish. Accordingly, it is preferable to employ a clear plastic seat such as polyethylene or polypropylene, and natural rubber flappers to seal against the seat. As illustrated in FIG. 2, the check valve 23 includes an inner chamber 31 in which is disposed a movable disc 33 of natural rubber that serves as a flapper of the check valve allowing the air to move the disc upwardly and pass around it interiorly of the check valve chamber 31 and thence out the effluent end 35. Specifically, the check valve has an inner seat 34 that is substantially planar, or lying in a single plane, to facilitate sealingly seating of the flapper 33. Thus the natural rubber flapper 33 will sealingly engage the seat 34 even under the small differential pressure of the short head of water.

The air flow rate is adjusted by the air flow control valve 25. Any of the conventional types of air flow control valves can be employed. As indicated, plastic flow control valves are preferable, since they do not contain any source of contaminates for the fish. In the illustrated embodiment the air flow valve 25 has a male-female type end connections with a plastic fitting inserted in the female end of the valve and onto which a small polyethylene hose; for example, one-eighth inch; may be inserted to form an air impermeable path. The flow rate control is effected by turning the control knob 37 on the valve 25. The flow rate may be adjusted for any fish appropriate to oxygenate the water for the number of fish in the upper transparent container 13. It is important that the adjustments be very fine in order to not roil the water and kill the fish, yet provide adequate oxygen. As will be appreciated, a few bubbles per minute would not oxygenate the water adequately for a large number of fish. On the other hand, roiling the water may prove fatal for the fish in the smaller aquariums.

The illustrated embodiment of FIG. 1, is sold complete in a kit form. In the kit is included gravel 39, greenery 41 and all the other elements described above, as well as fish food.

If desired, back lights and the like can be provided as separate accessories for countertops, offices and the like.

In operation, the unit has the respective elements prepared and suitably connected. For example, the greenery, gravel, real or fake, upper transparent container 13, base 15, air inlet 17, check valve 23, air conduit 21, air pump 19, air control valve 25 and the like are all assembled as illustrated in the Figs. It is imperative in this unit that the side walls, the bottom and the valve body be integrally formed together to prevent leaks for safety. The air pump is connected to a suitable source of power, as by electrical cord 43 and started to pump air up through the check valve 23. Water is placed in the container and the air flow rate adjusted. Thereafter, fish can be placed in the container. Of course, the unit can be readily changed out and cleaned up as by changing out the water and the like.

As can be seen in the foregoing, the unit achieves the objects delineated hereinbefore and provides the features not heretofore provided by the prior art.

While a variety of materials have been named for the manufacture of the respective elements, other materials that prove themselves can be employed. For example, crystal styrene has recently proved to be satisfactory for molding the container, its bottom and the valve body as well as making other elements such as portions of the base. Also, polyurethane may be employed for making the flapper of the check valve, although natural rubber is surprisingly superior.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. An aquarium for maintaining fish and the like comprising:
   a. an upper transparent container means for holding water and fish; said transparent container means having integrally molded bottom and side walls so as to be a unitary and waterproof without a leak of water therefrom and having a first size of first predetermined dimensions laterally not to exceed one foot;
   b. a base supporting said transparent container means and having a second size of second predetermined dimension laterally sufficient to support said transparent container means;
   c. an air pump for pumping an oxygen-containing gas through said transparent container means;
   d. at least one air conduit connected with said transparent container means and said air pump to define a conductive air passageway from said air pump to said transparent container means;
   e. an air flow control valve disposed in said air passageway such that the rate of flow of said oxygen-containing gas can be adjusted to a desired rate to prevent killing the fish;
   said air pump, air conduits and air flow control valve being disposed in said base out of sight, said upper transparent container means having integrally formed side wall, bottom and a valve body in said bottom for alleviating problems with leaking said valve body having a protector sleeve and a nipple protruding beneath said bottom and defining a passageway through said bottom and interiorly of said transparent container means with an air inlet penetrating above the bottom of said transparent container means such that an oxygen-containing gas can be bubbled upwardly through said water in said upper transparent container means without leaking; and a check valve above said nipple for preventing water from running into said air passageway thereby preventing water from running from said transparent container through said air inlet; said valve body and said air inlet protruding upwardly from said bottom into said transparent container means for a distance sufficient to allow simulated gravel to be disposed in said bottom and about said check valve such that said oxygen-containing gas can be bubbled upwardly without agitating settlings in said simulated gravel; and
   f. simulated gravel disposed in said bottom so as to receive settlings from the water in said upper transparent container means.

2. The aquarium of claim 1 wherein said elements a-f are provided in kit form along with simulated greenery and said air pump is connected by air conduit with said air flow control valve, which is, in turn connected by air conduit with said nipple protruding beneath the bottom of said transparent container means and interiorly of said protector sleeve, said hose, said protector sleeve and said nipple being sized so as to interferingly fit and compressingly hold said hose in place; said pump having an electric cord for plugging into a conventional alternating current electrical source.

3. The aquarium of claim 1 wherein said valve body has an interior chamber housing a flapper of said check valve; said check valve has a flat seat with a smooth, substantially planar sealing surface and said check valve has a flat natural rubber flapper for seating sealingly against said flat seat; wherein said valve body has a snap-in top having an upwardly extending nipple disposed above said check valve.

* * * * *